United States Patent
Bamberger et al.

(10) Patent No.: US 10,298,021 B2
(45) Date of Patent: May 21, 2019

(54) METHOD AND CONTROL DEVICE FOR CONTROLLING AN OPERATING FREQUENCY OF AN ENERGY SOURCE IN AN AC VOLTAGE NETWORK

(71) Applicant: SIEMENS AKTIENGESELLSCHAFT, München (DE)

(72) Inventors: Joachim Bamberger, München (DE); Michael Bernhard Buhl, Grafing (DE); Ulrich Münz, München (DE); Florian Steinke, München (DE); Jeremy Ralph Wiles, Graäfenberg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 127 days.

(21) Appl. No.: 15/301,732

(22) PCT Filed: Apr. 2, 2015

(86) PCT No.: PCT/EP2015/057281
§ 371 (c)(1),
(2) Date: Oct. 4, 2016

(87) PCT Pub. No.: WO2015/176862
PCT Pub. Date: Nov. 26, 2015

(65) Prior Publication Data
US 2017/0070055 A1 Mar. 9, 2017

(30) Foreign Application Priority Data
May 20, 2014 (DE) .................. 10 2014 209 541

(51) Int. Cl.
*H02J 1/10* (2006.01)
*H02J 3/38* (2006.01)
(Continued)

(52) U.S. Cl.
CPC .................. *H02J 3/46* (2013.01); *H02J 3/28* (2013.01); *H02J 3/381* (2013.01); *H02J 3/382* (2013.01);
(Continued)

(58) Field of Classification Search
CPC ...... H02J 3/46; H02J 3/28; H02J 3/385; H02J 3/383; H02J 3/387; H02J 3/382;
(Continued)

(56) References Cited

U.S. PATENT DOCUMENTS

| 2008/0296897 | A1 | 12/2008 | Kovach et al. |
| 2011/0043160 | A1 | 2/2011 | Serban |
| 2012/0326649 | A1 | 12/2012 | Patanaik et al. |

FOREIGN PATENT DOCUMENTS

| EP | 1914419 | 4/2008 |
| WO | WO 2012103889 A2 | 8/2012 |

OTHER PUBLICATIONS

Wu D. et al: Coordinated Primary and Secondary Control with Frequency-Bus-Signaling for Distributed Generation and Storage in Islanded Microgrids; Industrial Electronics Society, IECON 2013—39th Annual Conference of the IEEE; pp. 7140-7145; ISSN: 1553-572X; 2013.

(Continued)

*Primary Examiner* — Richard Tan
(74) *Attorney, Agent, or Firm* — Schmeiser, Olsen & Watts, LLP

(57) ABSTRACT

A power balance-dependent operating parameter and a surroundings parameter of a first energy source, such as a renewable energy source, are provided. A variable target operating parameter for the first energy source is ascertained dependent on the detected surroundings parameter. The target operating parameter can characterize a first energy source state in which a maximally possible output would be generated under the current given conditions of the sur- (Continued)

Figure 1:
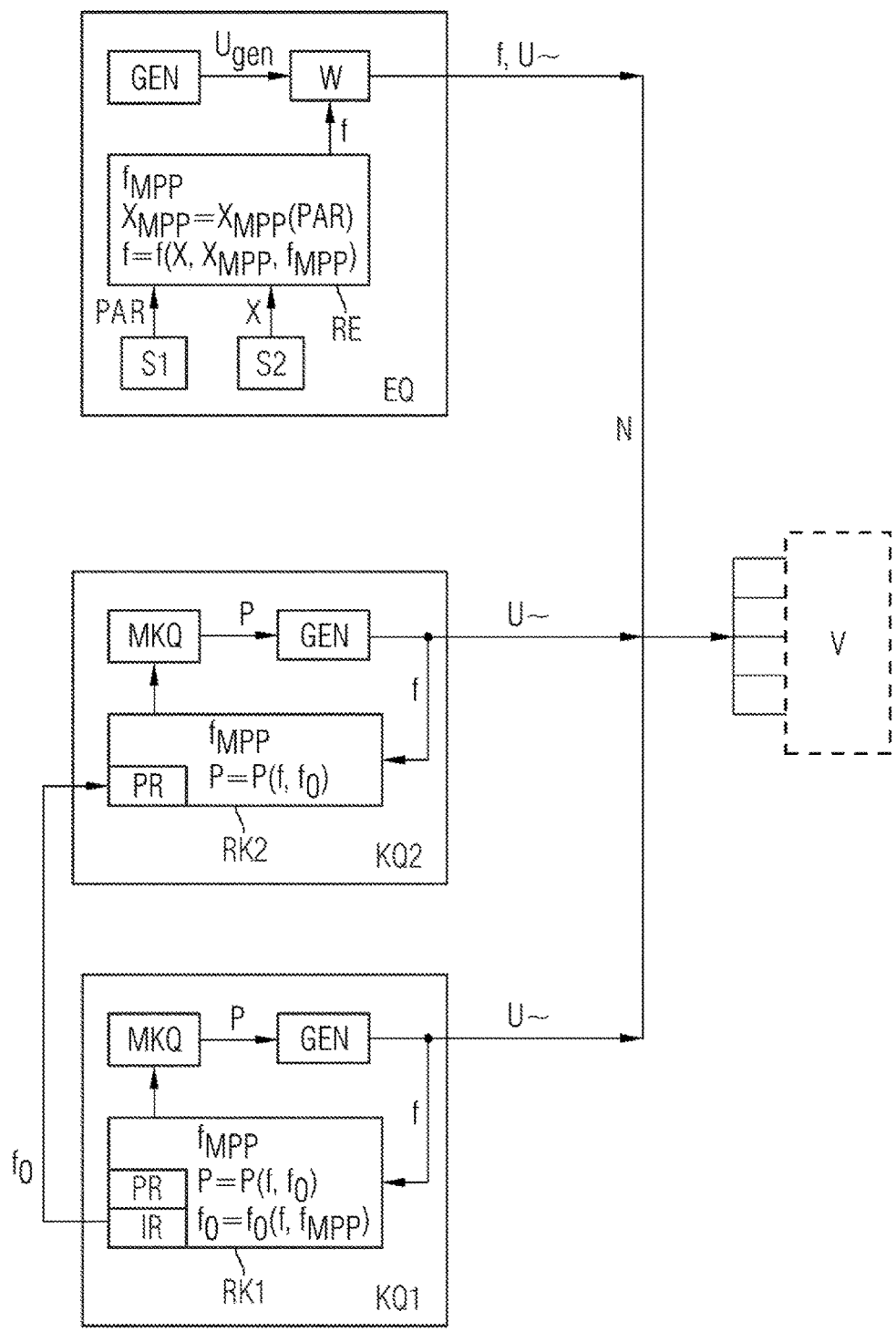

roundings. The operating frequency is then controlled dependent on the detected power balance dependent operating parameter and the ascertained target operating parameter such that a deviation of the operating frequency from a specified frequency is coupled to a deviation of the detected power balance-dependent operating parameter from the ascertained target operating parameter.

11 Claims, 2 Drawing Sheets

(51) Int. Cl.
  *H02J 3/46*   (2006.01)
  *H02J 3/28*   (2006.01)
  *H02J 3/00*   (2006.01)

(52) U.S. Cl.
  CPC ............. *H02J 3/383* (2013.01); *H02J 3/385* (2013.01); *H02J 3/386* (2013.01); *H02J 3/387* (2013.01); *H02J 2003/007* (2013.01); *Y02E 10/563* (2013.01); *Y02E 10/763* (2013.01); *Y02E 60/76* (2013.01); *Y04S 40/22* (2013.01)

(58) Field of Classification Search
  CPC ...... H02J 3/381; H02J 3/386; H02J 2003/007; Y02E 10/763; Y02E 10/563; Y02E 60/76; Y04S 40/22
  USPC .......................................................... 307/52
  See application file for complete search history.

(56) References Cited

OTHER PUBLICATIONS

De Matos J.G. et al: Power Control in AC Autonomous and Isolated Microgrids with Renewable Energy Sources and Energy Storage Systems; Industrial Electronics Society, IECON 2013 39th Annual Conference of the IEEE; pp. 1827-1832; ISSN:1553-572X; 2013.
International Search Report PCT/EP2015/057281, International Filing Date: Apr. 2, 2015; 3 Pgs..

METHOD AND CONTROL DEVICE FOR CONTROLLING AN OPERATING FREQUENCY OF AN ENERGY SOURCE IN AN AC VOLTAGE NETWORK

CROSS-REFERENCE TO RELATED APPLICATIONS

This application claims priority to PCT Application No. PCT/EP2015/057281, having a filing date of Apr. 2, 2015, based off of DE Application No. 10 2014 209 541.7 having a filing date of May 20, 2014, the entire contents of which are hereby incorporated by reference.

FIELD OF TECHNOLOGY

The following relates to a method and a control device for controlling an operating frequency of an energy source in an AC voltage network, and more specifically to energy sources such as renewable energy.

BACKGROUND

As resources are becoming scarcer, great efforts are currently being made to increase the proportion of renewable energy sources in the overall energy supply in comparison with the proportion of conventional energy sources. Conventional energy sources, for example gas, coal-fired or nuclear power plants, are characterized by a consumption of non-regenerative raw materials, whereas renewable energy sources are based on energy carriers which regenerate.

However, in comparison with conventional energy sources, renewable energy sources are often subject to fluctuations in the currently available energy carriers, for example the instantaneous solar radiation in photovoltaic installations or the instantaneous wind strength in wind power plants, as a result of which the power which can be supplied to a common power supply network may likewise vary greatly. Since a multiplicity of energy sources and consumers are often connected to a typical power supply network, a certain amount of coordination of the various suppliers is required. In an AC voltage network, the network voltage and the network frequency, in particular, may have only small ranges of variation. These supply parameters are usually controlled in such a manner that individual fluctuations in the various energy sources are at least partially compensated for by means of negative feedback effects. For example, a surplus of electrical power in a conventional energy source results in its operating frequency, that is to say the frequency of the AC voltage supplied to the AC voltage network by this energy source, increasing. This results in more power flowing into the AC voltage network on account of the positive phase shift of the supplied AC voltage, thus increasing the individual load on this energy source and thus counteracting a further increase in the operating frequency.

The renewable and conventional energy sources are currently usually coordinated by virtue of the renewable energy sources being connected to the AC voltage network as current sources and the conventional energy sources being connected to the AC voltage network as voltage sources. In this manner, a renewable energy source can vary the supplied current according to the currently available power while automatically adapting to the voltage currently present in the AC voltage network. In contrast, the conventional energy sources operated as voltage sources are responsible for forming the network, that is to say for specifying operating parameters of the AC voltage network, for example the network voltage, and for providing the power required for this purpose.

In the type of coordination described above, the renewable energy sources are operated at the maximum power point (or MPP), however, only as long as the network frequency remains below a predefined threshold value. Above the threshold value, the available power from the renewable energy sources is generally not completely used at the expense of an increased resource consumption of the conventional energy sources.

SUMMARY

An aspect relates to a method, a control device and a computer program product for controlling an operating frequency of an energy source in an AC voltage network, which allow better coordination of various energy sources.

According to embodiments of the invention, in order to control an operating frequency of a first energy source in an AC voltage network, a power-balance-dependent operating parameter and an environmental parameter of the first energy source are recorded. The first energy source may preferably be a renewable energy source, for example a photovoltaic installation or a wind power plant, or else a conventional power plant. In this case, the power-balance-dependent operating parameter may indicate a state of the first energy source, the change in which results from a power balance at an energy buffer store of the first energy source. In the case of a photovoltaic installation, this power-balance-dependent operating parameter may be, for example, the voltage across the intermediate circuit capacitor of the photovoltaic installation and, in the case of a wind power plant, may be its rotor speed, for example. The environmental parameter may indicate one or more external influences, for example the instantaneous solar radiation and/or wind strength, to which the first energy source is exposed and which influence a power which can be currently generated by the first energy source. According to embodiments of the invention, a variable desired operating parameter is determined for the first energy source on the basis of the recorded environmental parameter. This desired operating parameter can preferably indicate a state of the first energy source in which a maximum possible power under the instantaneous environmental conditions would be generated. The operating frequency is controlled on the basis of the recorded power-balance-dependent operating parameter and the determined desired operating parameter in such a manner that a deviation of the operating frequency from a predefined frequency is coupled to a deviation of the recorded power-balance-dependent operating parameter from the determined desired operating parameter.

According to embodiments of the invention, a control device and a computer program product for controlling the operating frequency of an energy source in the AC voltage network are also provided, which control device and computer program product are set up to carry out the above method. Embodiments of the invention allow deviations of a power balance of the first energy source from a currently determined desired power balance to be made easily discernible for other energy sources in the AC voltage network on the basis of the operating frequency which is accordingly controlled and distributed over the AC voltage network. A first energy source, in particular a renewable energy source, can therefore be coordinated with conventional energy sources in the AC voltage network in such a manner that the renewable energy source is operated at a maximum power point for as long as possible. Such coordination allows a generated active power to be divided between renewable and conventional energy sources in the common AC voltage network in a manner which is optimal for consumption.

Another advantage of embodiments of the invention can be seen in the fact that there is no need for any additional communication between the energy sources in the common AC voltage network for coordination. Even addition of further first energy sources to the AC voltage network does not require any additional communication.

Advantageous embodiments and developments of the invention are stated in the dependent claims.

According to one advantageous embodiment of the invention, the first energy source, and therefore in particular a renewable energy source, can be operated as a voltage source in the AC voltage network.

As a voltage source, the first energy source can make a stabilizing contribution to forming the network and can increase the redundancy of the voltage stabilization in the AC voltage network. By virtue of the fact that renewable energy sources are also operated in parallel with conventional energy sources as network-forming voltage sources, the probability of a network collapse can therefore be considerably reduced. In addition, sudden load changes in the AC voltage network can be better compensated for since sudden load changes are generally intercepted only by voltage sources and not by current sources.

According to one preferred embodiment of the invention, the operating frequency distributed across the AC voltage network can be recorded in order to control a second energy source supplying the AC voltage network. The second energy source may be, in particular, a conventional energy source, for example a gas, coal-fired or nuclear power plant, but may also be a renewable energy source. A power of the second energy source can be changed on the basis of the recorded operating frequency if the recorded operating frequency deviates from the predefined frequency. In this case, the power to be changed may be, for example, a mechanical power to be supplied to a generator of the second energy source or a power to be supplied to the AC voltage network by the second energy source.

Controlling the power of the second energy source on the basis of the recorded operating frequency allows the generated active power to be divided between the first and second energy sources in a manner optimized according to predefinable criteria.

According to one preferred embodiment of the invention, if the recorded operating frequency deviates from the predefined frequency, the power can be controlled in such a manner that, as a result of the operating frequency distributed across the AC voltage network being coupled to a power balance of the second energy source, the operating frequency distributed across the AC voltage network approaches the predefined frequency.

Conventional energy sources are often connected to a common AC voltage network, in particular, in such a manner that phase differences in the supplied AC voltage are fed back to the supplied power and therefore to the individual load on the respective energy source. The operating frequency of this energy source then changes on the basis of the individual load in such a manner that the phase shift and therefore a further change in the operating frequency of this energy source are counteracted. As a result of the above power control, the operating frequency distributed across the AC voltage network can therefore be stabilized in the direction of the predefined frequency.

According to one advantageous embodiment, a variable reference frequency can be determined for the second energy source and the power can be controlled by means of a proportional controller on the basis of the recorded operating frequency and the determined reference frequency. Such a proportional controller allows fast-reacting control of the power of the second energy source.

The reference frequency can preferably be controlled by means of an integrating controller on the basis of a deviation of the recorded operating frequency from the predefined frequency.

This division of the power control into proportional control of the power on the basis of the reference frequency and integrating control of the reference frequency means that the predefined frequency is established in the AC voltage network in the steady state.

For a plurality of second energy sources supplying the AC voltage network, the power can be individually controlled for each of the plurality of second energy sources, whereas the reference frequency can be jointly controlled for all of the plurality of second energy sources. The joint controlled reference frequency can be transmitted to the proportional controllers for the plurality of second energy sources.

A threshold value for the reference frequency can be provided for the integrating controller, the reaching of which threshold value influences integration of the reference frequency, preferably ends integration. This makes it possible to avoid so-called wind-up effects of the integrating controller.

The operating frequency can be advantageously set by means of an inverter, via which the first energy source is coupled to the AC voltage network. This allows the operating frequency of the first energy source to be set in a flexible and needs-based manner.

One advantageous embodiment may provide for the power-balance-dependent operating parameter to increase if a power balance of the first energy source is positive and/or to fall if the power balance of the first energy source is negative. The operating frequency can therefore be set to be greater than the predefined frequency if the recorded power-balance-dependent operating parameter is greater than the determined desired operating parameter and/or can be set to be smaller than the predefined frequency if the recorded power-balance-dependent operating parameter is smaller than the determined desired operating parameter.

With the control characteristic above, an operating frequency which is greater than the predefined frequency can indicate in the AC voltage network that the first energy source, in particular a renewable energy source, could currently deliver more power to the AC voltage network.

BRIEF DESCRIPTION

Figure 2:
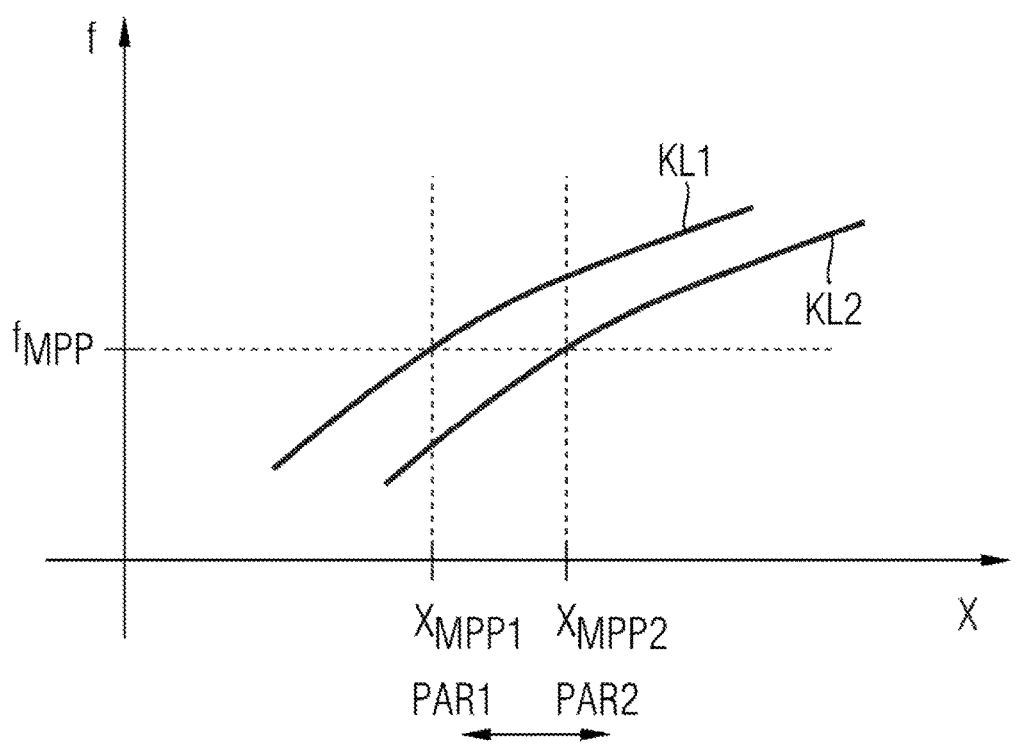

Some of the embodiments will be described in detail, with reference to the following figures, wherein like designations denote like members, wherein:

FIG. 1 shows an embodiment of a power supply network having a plurality of energy sources; and FIG. 2 shows an embodiment of a family of characteristics for controlling an operating frequency of an energy source.

DETAILED DESCRIPTION

FIG. 1 illustrates a power supply network having a first energy source EQ and a plurality of second energy sources KQ1 and KQ2 which supply an AC voltage U~ to an AC voltage network N, for example a high-voltage, medium-voltage and/or low-voltage network. A multiplicity of consumers V are directly or indirectly connected to the AC voltage network N.

In the present exemplary embodiment, a renewable energy source, for example a photovoltaic installation or a wind turbine, is provided as the first energy source EQ. The second energy sources KQ1 and KQ2 are preferably conventional energy sources, for example gas, coal-fired or nuclear power plants. Embodiments of the invention are intended to be used to coordinate the renewable energy source EQ with the conventional energy sources KQ1 and KQ2 in such a manner that the renewable energy source EQ can supply its power, which can be produced at most at a respective time, to the AC voltage network N as often as possible and/or for as long as possible in order to thus reduce a resource consumption of the conventional energy sources KQ1 and KQ2. For this purpose, the aim is to operate the renewable energy source EQ at or in the vicinity of its maximum power point (MPP) as far as possible. The maximum power point generally depends on environmental conditions of the renewable energy source EQ, for example the instantaneous solar radiation or wind strength.

In FIG. 1, the renewable energy source EQ and the conventional energy sources KQ1 and KQ2 may also be representative of a multiplicity of renewable energy sources and conventional energy sources.

The renewable energy source EQ comprises a generator GEN which generates an electrical power with a voltage $U_{gen}$, for example photovoltaically in the case of a photovoltaic installation or from supplied mechanical power, for example from a wind rotor. The voltage $U_{gen}$ generated by the generator GEN is supplied to an inverter W which uses the supplied voltage $U_{gen}$ to generate an AC voltage U~ with an adjustable frequency f. The voltage U~ is supplied to the AC voltage network N from the inverter W. The renewable energy source EQ therefore acts as a voltage source in the AC voltage network N. f is the operating frequency of the renewable energy source EQ, which is locally present at the supply point of the renewable energy source EQ, and is distributed across the AC voltage network N.

In order to control the operating frequency f, the renewable energy source EQ has a control device RE and sensors S1 and S2 for recording local parameters of the renewable energy source EQ. The controlled operating frequency f is transmitted from the control device RE to the inverter W. The sensor S1 records one (or else more) environmental parameter PAR of the renewable energy source EQ and transmits it to the control device RE. The environmental parameter PAR represents one or more external influences, for example the instantaneous solar radiation and/or wind strength, to which the renewable energy source EQ is exposed and which influence a power which can currently be generated by the renewable energy source EQ.

The sensor S2 records a power-balance-dependent operating parameter X of the renewable energy source EQ and transmits it to the control device RE. The power-balance-dependent operating parameter X indicates a state of the renewable energy source EQ, the change in which results from the power balance at an energy buffer store (not illustrated) of the renewable energy source EQ. In the case of a photovoltaic installation, this power-balance-dependent operating parameter may be, for example, the voltage across the intermediate circuit capacitor of the photovoltaic installation and, in the case of a wind power plant, may be its rotor speed, for example. It is assumed that a currently positive power balance, that is to say more power is currently generated by the generator GEN than is delivered to the AC voltage network N, results in an increase in the power-balance-dependent operating parameter X. In particular, a currently generated power and/or an instantaneous maximum power point of the renewable energy source EQ depend on the power-balance-dependent operating parameter X.

The value of a firmly predefined frequency $f_{MPP}$ is stored in the control device RE. The predefined frequency $f_{MPP}$ is constant and is the same for all renewable energy sources in the AC voltage network N. In addition, the predefined frequency $f_{MPP}$ is also known and stored in the conventional energy sources KQ1 and KQ2. The control device RE determines, on the basis of the environmental parameter PAR, a variable desired operating parameter $X_{MPP}$ which indicates that state of the renewable energy source EQ in which a maximum possible power under the instantaneous environmental conditions would be generated. This state corresponds substantially to the above-mentioned maximum power point of the renewable energy source EQ and optimizes the power in this sense.

The instantaneous operating frequency f is determined by the control device RE on the basis of the instantaneous power-balance-dependent operating parameter X, the instantaneous desired operating parameter $X_{MPP}$ and the predefined frequency $f_{MPP}$ according to a predefined characteristic curve or a family of characteristics. In particular, a deviation of the operating frequency f from the predefined frequency $f_{MPP}$ is dependent on a deviation of the power-balance-dependent operating parameter X from the desired operating parameter $X_{MPP}$. Provided that the operating frequency f is distributed across the AC voltage network N, the deviation of the operating frequency f from the frequency $f_{MPP}$ predefined in the AC voltage network N and therefore deviations of the power-balance-dependent operating parameter X from the desired operating parameter $X_{MPP}$ in the renewable energy source EQ are discernible for other energy sources coupled to the AC voltage network N.

The conventional energy sources KQ1 and KQ2 each have a mechanical power source MKQ, for example a gas turbine or a diesel engine, which supplies a mechanical power P to an electric generator GEN. The generator GEN generates, on the basis of the supplied mechanical power P, an AC voltage U~ which is supplied to the AC voltage network N.

The conventional energy source KQ1 also has a control device RK1 and the conventional energy source KQ2 has a control device RK2. The control devices RK1 and RK2 each record the operating frequency f distributed across the AC voltage network N and, on the basis thereof, control the mechanical power P to be generated by a respective mechanical power source MKQ. The predefined frequency $f_{MPP}$ is respectively stored in the control devices RK1 and RK2, with the result that the control devices RK1 and RK2 can use the recorded operating frequency f to determine its deviation from the predefined frequency $f_{MPP}$. As already mentioned above, this deviation shows the extent to which the power-balance-dependent operating parameter X deviates from the instantaneous power-optimizing desired operating parameter $X_{MPP}$.

In order to optimize the power delivered by the renewable energy source EQ, the mechanical power P of the respective mechanical power source MKQ is controlled on the basis of the recorded operating frequency fin such a manner that the operating frequency f approaches the predefined frequency $f_{MPP}$ and the power-balance-dependent parameter X therefore approaches the desired operating parameter $X_{MPP}$ by virtue of the above-mentioned coupling of a local operating frequency to a local power balance.

In order to control the mechanical power P to be supplied to the generators GEN, the control devices RK1 and RK2 each have a proportional controller PR. Such a proportional controller PR is often also referred to as a P controller. In this case, the mechanical power P is respectively controlled as a function $P(f, f_0)$ of the recorded operating frequency f and a reference frequency $f_0$. In this case, the reference frequency $f_0$ is controlled at a central point in the AC voltage network N, here by means of an integrating controller IR of the control device RK1 as a function $f_0(f, f_{MPP})$ of the recorded operating frequency f and the predefined frequency $f_{MPP}$. Such an integrating controller is often also referred to as an I controller. The currently controlled values of the reference frequency $f_0$ are transmitted from the central point, here RK1, to the other conventional energy sources present in the AC voltage network N, here KQ2, in order to control the respective mechanical power P by means of the respective local proportional controller PR.

FIG. 2 illustrates a family of characteristics for controlling the operating frequency f of the renewable energy source EQ by means of the control device RE. The power-balance-dependent operating parameter X is plotted along the abscissa and the operating frequency f is plotted along the ordinate. The constant, predefined frequency $f_{MPP}$ is indicated by a dotted line. Different desired operating parameters $X_{MPP1}$ and $X_{MPP2}$ which correspond to different environmental conditions PAR1 and PAR2 are indicated by dotted lines on the abscissa. In the case of environmental conditions corresponding to the environmental parameter PAR1, the renewable energy source EQ would generate its currently maximum possible power for $X=X_{MPP1}$, whereas, in the case of environmental conditions corresponding to the environmental parameter PAR2, the maximum power would be generated for $X=X_{MPP2}$. In the case of the environmental conditions characterized by PAR1, the operating frequency f is controlled on the basis of a characteristic curve KL1, whereas, in the case of environmental conditions characterized by PAR2, the operating frequency f is controlled on the basis of a characteristic curve KL2. The characteristic curves KL1 and KL2 are aligned in such a manner that, if the power-balance-dependent operating parameter X matches the respective desired operating parameter $X_{MPP1}$ or $X_{MPP2}$, the same constant frequency $f_{MPP}$ is respectively set as the operating frequency f. This also applies to all other characteristic curves in the family of characteristics for possible other values of the environmental parameter PAR.

The characteristic curves KL1 and KL2 increase in a strictly monotonous manner in the region of the predefined frequency $f_{MPP}$, with the result that, with an increasing power-balance-dependent operating parameter X, that is to say a positive power balance of the energy source EQ, the operating frequency f likewise increases. For example, the operating frequency f could be controlled according to $f=f_{MPP}+k*(X-X_{MPP})$, where k is a monotonously or strictly monotonously increasing function or a positive constant. This means that $f>f_{MPP}$ if $X>X_{MPP}$ and $f<f_{MPP}$ if $X<X_{MPP}$.

By means of the family of characteristics, the renewable energy source EQ couples a respective instantaneous value of the desired operating parameter $X_{MPP}$, which corresponds to that state of the renewable energy source EQ in which the maximum possible power at the current time is generated, to the fixed predefined frequency $f_{MPP}$. In this case, the value of the desired operating parameter $X_{MPP}$ can vary on the basis of the instantaneous environmental conditions. In contrast, the predefined frequency $f_{MPP}$ oriented to the varying desired operating parameter $X_{MPP}$ is constant.

For the conventional energy sources KQ1 and KQ2, the mechanical power P supplied to the respective generator GEN is controlled in such a manner that the predefined frequency $f_{MPP}$ is established in the AC voltage network N at least in the steady-state limit case. The above control behavior can be achieved, for example, by controlling the mechanical power P by means of the respective proportional controller PR using so-called droop characteristic curves according to $P=P_0-k_p*(f-f_0)$, where $P_0$ is a predefined reference power, $k_p$ is a preferably positive constant and $f_0$ is the reference frequency.

Whereas the mechanical power P in each conventional energy source KQ1 and KQ2 is locally evaluated, the reference frequency $f_0$ is controlled at a central point in the AC voltage network, here KQ1, and is distributed to all conventional energy sources KQ1 and KQ2. The reference frequency $f_0$ is preferably controlled by the central integrating controller IR according to $d/dt\ f_0=-k_i*(f-f_{MPP})$, where $k_i$ is a preferably positive constant. In this manner, the reference frequency $f_0$ falls continuously as long as the operating frequency f is greater than the predefined frequency $f_{MPP}$ and increases continuously as long as the operating frequency f is lower than the predefined frequency $f_{MPP}$. For controlling the power of the conventional energy sources KQ1 and KQ2, this means that, if the operating frequency f is greater than the predefined frequency $f_{MPP}$, the reference frequency $f_0$ falls and the conventionally generated power therefore falls, as a result of which the proportion of the power coming from the renewable energy source EQ in the AC voltage network N increases. Overall, an operating point for which $X>X_{MPP}$ and therefore $f>f_{MPP}$ results in the renewable energy source EQ being able to supply its excess power to the AC voltage network N preferentially over the conventional energy sources KQ1 and KQ2.

Optionally, the reference frequency $f_0$ can also be controlled by the central integrating controller IR according to $d/dt\ f_0=-k_i*(f-f_{MPP}-\Delta f)$, where $\Delta f$ is a constant which can be used to take into account a steady-state deviation from the maximum power point. This makes it possible to ensure in many cases that the inverter W can provide a control reserve.

In order to avoid over-integration or under-integration of the reference frequency $f_0$, that is to say so-called wind-up effects, suitable anti-wind-up measures can be provided in the integrating controller IR. Suitable upper limits and lower limits can therefore be defined for the reference frequency $f_0$, the reaching of which ends or slows down the integration in the direction of the respective limit.

If one or more renewable energy sources and one or more conventional energy sources are controlled in the described manner, the renewable energy sources can be operated at their maximum power point considerably more frequently, for considerably longer and/or closer to their maximum power point than without such control. In the steady state, the renewable energy sources are operated at the maximum power point at least as long as the anti-wind-up measures do not become active. The coordination of the energy sources which is required for this is effected substantially using the operating frequency f and the central specification of the frequency $f_{MPP}$. Additional communication in order to coordinate the various energy sources is avoided hereby.

As soon as the anti-wind-up measures become active, the renewable energy source EQ is generally no longer operated at its maximum power point. If the operating frequency f is greater than the predefined frequency $f_{MPP}$, the renewable energy source EQ is limited. In this case, however, the reference frequency $f_0$ is already at the lower integration limit, with the result that the conventional energy sources KQ1 and KQ2 are operated with their minimum power in each case. In the ideal case, the conventional energy sources KQ1 and KQ2 are then switched off. If, in contrast, the operating frequency f is less than the predefined frequency $f_{MPP}$, the voltage U~ in the AC voltage network N is reduced since, in this case, the power jointly provided by the renewable energy source EQ and the conventional energy sources KQ1 and KQ2 no longer suffices to provide the power needed in the AC voltage network N.

On the basis of the operating frequency f of the renewable energy source EQ, which is distributed across the AC voltage network N, the other energy sources, here KQ1 and KQ2, in the AC voltage network N and also any desired other devices in the AC voltage network N and also the consumers V can discern whether there is a surplus or a deficit of a power generated in a renewable manner. There is generally a surplus when the operating frequency f is greater than the predefined frequency $f_{MPP}$. In this situation, the renewable energy sources are limited. An increase in the load could therefore be intercepted by the renewable energy sources and would not result in increased resource consumption of the conventional energy sources. If the operating frequency f is less than or equal to the predefined frequency $f_{MPP}$, an increased load results in an increased use of the conventional energy sources. The power consumption of controllable loads can therefore be adapted to the availability of renewable energy without the need for any additional communication, in addition to possibly transmitting the reference frequency $f_0$, for this purpose.

Embodiments of the invention can be applied not only to renewable energy sources but can also be advantageously applied to any desired energy sources in order to communicate their power balance to other energy sources connected to the AC voltage network or to any other desired devices using the operating frequency f.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for controlling an operating frequency of a first energy source in an AC voltage network, wherein a power-balance-dependent operating parameter of the first energy source is recorded, the method comprising:
   a) recording an environmental parameter of the first energy source;
   b) determining a variable desired operating parameter for the first energy source on a basis of the recorded environmental parameter; and
   c) controlling the operating frequency on a basis of the recorded power-balance-dependent operating parameter and the determined desired operating parameter in such a manner that a deviation of the operating frequency from a predefined frequency dependent on a deviation of the recorded power-balance-dependent operating parameter from the determined desired operating parameter; and
   d) controlling a second energy source supplying a voltage to the AC voltage network using the operating frequency distributed across the AC voltage network, wherein a mechanical power of the second energy source is changed on the basis of the operating frequency when the operating frequency deviates from the predefined frequency.

2. The method as claimed in claim 1, wherein the first energy source is operated as a voltage source in the AC voltage network.

3. The method as claimed in claim 1, wherein, if when the recorded operating frequency deviates from the predefined frequency, the mechanical power is controlled in such a manner that, as a result of the operating frequency distributed across the AC voltage network being dependent on a power balance of the second energy source, the operating frequency distributed across the AC voltage network approaches the predefined frequency.

4. The method as claimed in claim 1, wherein a variable reference frequency is determined for the second energy source and the power is controlled by means of a proportional controller on the basis of the recorded operating frequency and the determined reference frequency.

5. The method as claimed in claim 4, wherein the reference frequency is controlled by means of an integrating controller on the basis of a deviation of the recorded operating frequency from the predefined frequency.

6. The method as claimed in claim 5, wherein, for a plurality of second energy sources supplying the AC voltage network,
   a power of the plurality of second energy sources is individually controlled for each energy source of the plurality of second energy sources,
   a reference frequency of the plurality of second energy sources is jointly controlled for all of the plurality of second energy sources, and
   a joint controlled reference frequency of the plurality of second energy source is transmitted to proportional controllers for the plurality of second energy sources.

7. The method as claimed in claim 5 wherein a threshold value for the reference frequency is provided for the integrating controller, further wherein reaching the threshold value influences integration of the reference frequency.

8. The method as claimed in claim 1, wherein the operating frequency is set by means of an inverter, via which the first energy source is coupled to the AC voltage network.

9. The method as claimed in claim 1, wherein the power-balance-dependent operating parameter increases if a power balance of the first energy source is positive and/or falls if the power balance of the first energy source is negative, and in that the operating frequency is set to be greater than the predefined frequency if the recorded power-balance-dependent operating parameter is greater than the determined desired operating parameter and/or is set to be smaller than the predefined frequency if the recorded power-balance-dependent operating parameter is smaller than the determined desired operating parameter.

10. A control device for controlling the operating frequency of the first energy source in the AC voltage network, having all means for carrying out the method as claimed in claim 1.

11. A computer program product comprising a computer readable hardware storage device storing a computer readable program code, the computer readable program code comprising an algorithm that when executed by a computer processor of a computing system implements the method for controlling the operating frequency of the first energy source in the AC voltage network, as claimed in claim 1.

\* \* \* \* \*

UNITED STATES PATENT AND TRADEMARK OFFICE
CERTIFICATE OF CORRECTION

PATENT NO. : 10,298,021 B2
APPLICATION NO. : 15/301732
DATED : May 21, 2019
INVENTOR(S) : Joachim Bamberger et al.

It is certified that error appears in the above-identified patent and that said Letters Patent is hereby corrected as shown below:

On the Title Page

Item (72)/Inventors, please change:
"Joachim Bamberger, München (DE); Michael Bernhard Buhl, Grafing (DE); Ulrich Münz, München (DE); Florian Steinke, München (DE); Jeremy Ralph Wiles, Graäfenberg (DE)"

To:
--Joachim Bamberger, München (DE); Michael Bernhard Buhl, Grafing (DE); Ulrich Münz, München (DE); Florian Steinke, München (DE); Jeremy Ralph Wiles, Gräfenberg (DE)--

Signed and Sealed this
Seventh Day of July, 2020

Andrei Iancu
*Director of the United States Patent and Trademark Office*